Nov. 15, 1938.  J. COHEN  2,136,936

BUTTERMILK CHURN

Filed March 22, 1938   2 Sheets-Sheet 1

INVENTOR
*Julius Cohen*
BY
ATTORNEY

Nov. 15, 1938.  J. COHEN  2,136,936
BUTTERMILK CHURN
Filed March 22, 1938  2 Sheets-Sheet 2
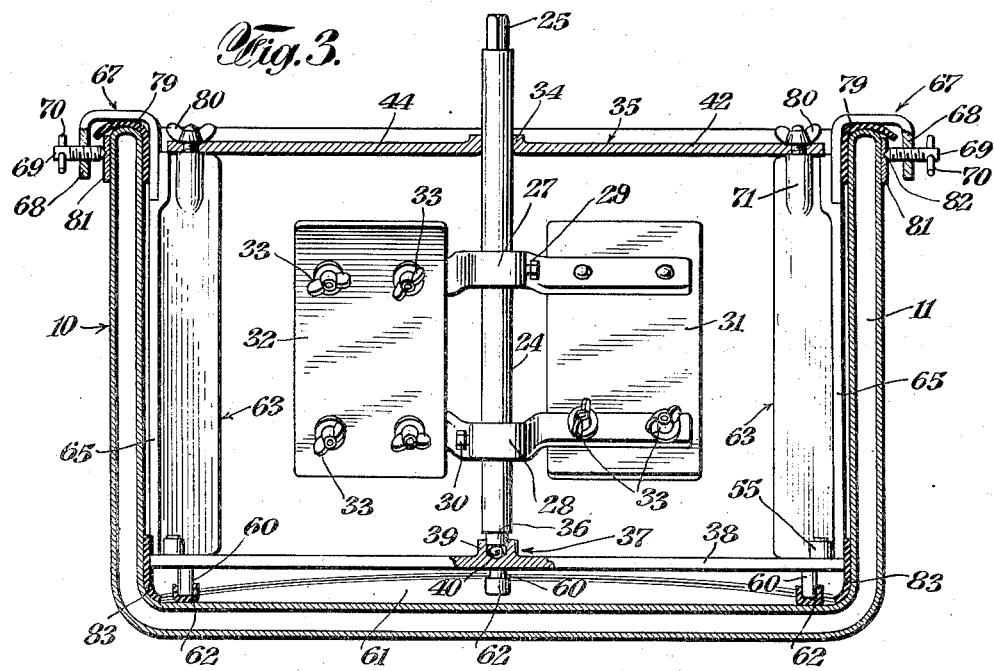
Fig. 3.
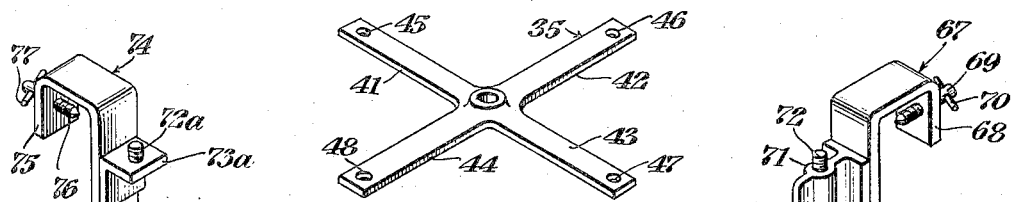
Fig. 4.
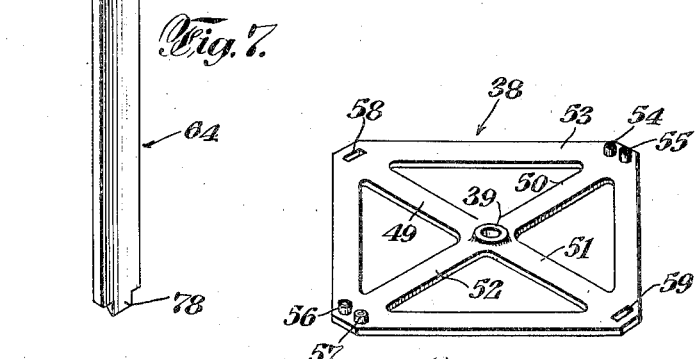
Fig. 7.
Fig. 5.
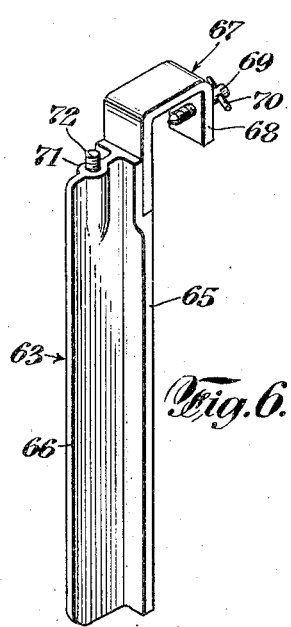
Fig. 6.
INVENTOR
Julius Cohen
BY
ATTORNEY Patented Nov. 15, 1938

2,136,936

UNITED STATES PATENT OFFICE 2,136,936

BUTTERMILK CHURN

Julius Cohen, New York, N. Y.

Application March 22, 1938, Serial No. 197,363

4 Claims. (Cl. 259—107)

This invention relates to an apparatus for the production of buttermilk by a mechanical method, the device employed by my invention being particularly adapted to supplement and improve upon the usual chemical method.

According to most common practice, buttermilk is manufactured by adding to skim milk a lactate acid culture whereby the fluid is brought to a predetermined degree of acidity considered suitable for consumption,—this being the purely chemical method. The resulting product is frequently not entirely satisfactory, particularly because of the fact that it does not have sufficient body or bulk, nor does it possess the distinctively characteristic buttermilk flavor. Attempts have also been made to produce buttermilk by mechanical agitation whereby, after the lactate acid culture had been introduced, quantities of butter-fat are added and the mixture mechanically agitated. In this latter method, rotary wooden drums have at times been employed to which the skim milk preparation is pumped, after it had been brought up to the required temperature in a separate heating unit. Although the resulting product by this mechanical method has generally been considered superior to that produced by the chemical process, in view of the fact that butter-fat particles are actually admixed with the fluid to impart a definite buttermilk flavor and to give thereto a desirable consistency, nevertheless the apparatus employed for this purpose has generally been space-consuming,—consisting of several units,—bulky and costly. Furthermore, pumping means were required to effectuate this process, which was not only expensive, but which also slowed down the process due to the viscosity of the liquid.

It is primarily within the contemplation of my invention to enable buttermilk to be produced by a mechanical method whereby the above-mentioned shortcomings are obviated.

It is also an object of this invention to combine in a single unitary structure an apparatus for both heating and churning the buttermilk, thereby effectuating the process in a single operation. And in this aspect of my invention, another object is to eliminate the cost of a separate heating unit, and the effort and expense involved in cleaning such a unit.

And it is a further object of this invention to produce buttermilk of proper body and flavor in a minimum of time.

Other objects, features and advantages will appear from the drawings and the description hereinafter given.

Referring to the drawings,

Figure 3 is a section of Figure 2 taken along line 3—3, the agitating blades being shown in a plane substantially parallel to the plane of the section.

Figure 4 is a perspective of the upper support for the agitator shaft.

Figure 5 is a perspective of the lower support or base for the agitator shaft.

Figure 6 is a perspective view of one of the two combination baffle and supporting members employed in this device, and Figure 7 is a perspective view of one of two other supporting members not provided with baffles.

Figure 1:
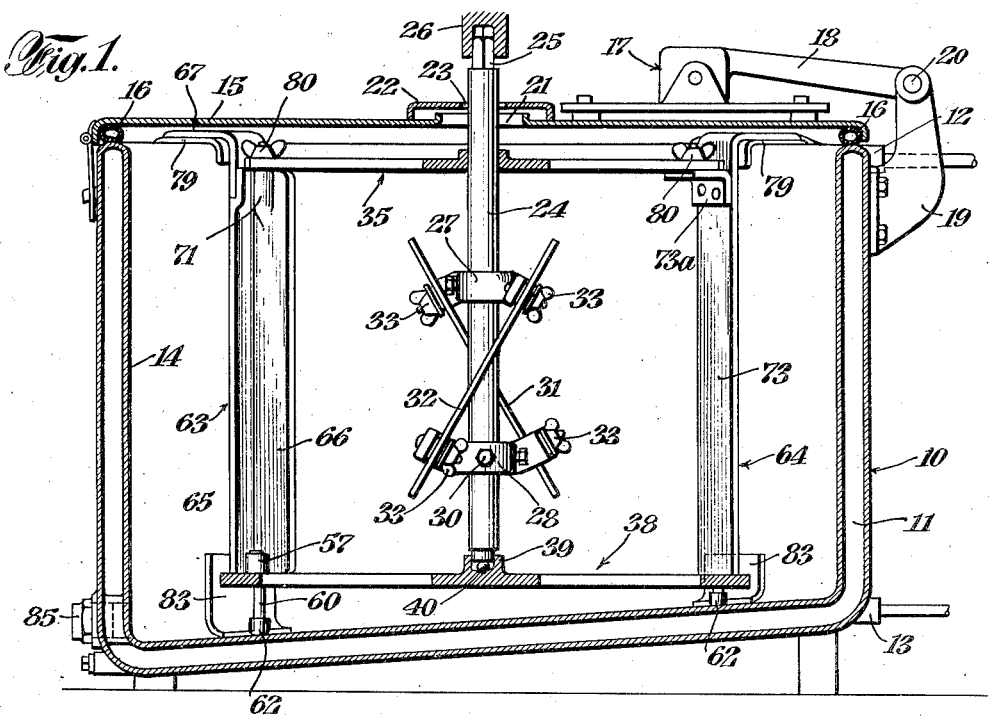
Figure 1 is a vertical sectional elevation of the combination vat and heater constituting part of my invention, showing a pair of agitator blades or paddles supported upon a vertical shaft extending through an aperture in the closed cover of the apparatus.
Figure 2:
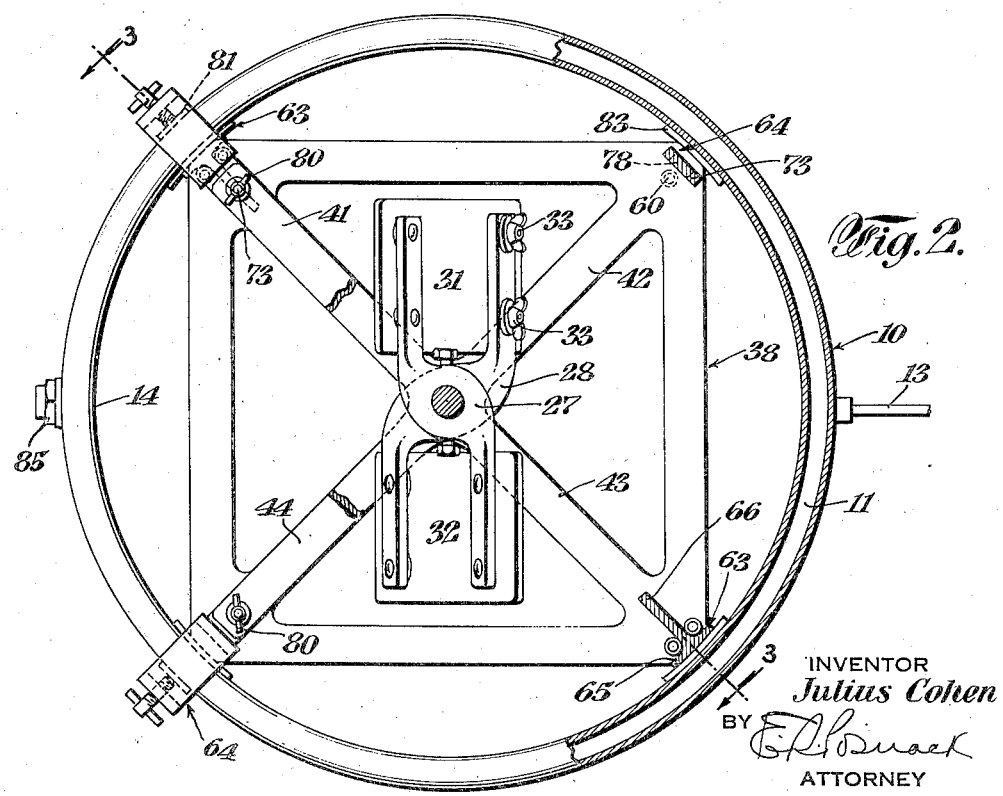
Figure 2 is a plan view of the device of Figure 1 with the cover removed, a portion of the structure being shown cut away to illustrate the steam jacket.

In the drawings, the vat 10 contains a steam jacket 11 preferably surrounding the lateral sides and base of the structure thereby enveloping substantially the entire volume of the vat. The steam inlets and outlets for the jackets are at the fittings 12 and 13 respectively, although they may be otherwise positioned in accordance with design requirements. The inner surface 14 of the vat is preferably glazed, both for sanitary reasons and to prolong the life of the structure. A cover 15, of more or less conventional design, is positioned over the vat, Figure 1 showing the cover resting upon a yieldable pad, illustrated as being the rubber tubing 16, positioned upon the upper peripheral portion of the vat. The said cover has secured thereto a bracket member 17 and arm 18 which is pivotally secured to the bracket 19 suitably attached to the outer wall of the vat. With this arrangement of more or less conventional design, the cover can be pivotally lifted by swinging it around the axis 20. Said cover also contains a central aperture 21, and has surmounted thereover an auxiliary cover plate 22 also containing an apertured portion 23 in registry with the aperture 21.

Extending vertically through the apertures 21 and 23 is the agitator shaft 24, this containing an upper terminal portion 25 detachably engageable with removable coupling means 26 attached to suitable motor means not shown on the drawings. The said shaft 24 has suitably attached thereto two spaced brackets 27 and 28, the securing means being illustrated in the drawings as set screws 29 and 30 although it is understood that other keying or securing means may be employed for this purpose. Attached to these brackets are the agitating blades or paddles 31 and 32, substantially vertically disposed, each of said paddles being supported on diametrically opposite sides of the shaft 24 by both of said brackets 27 and 28. Although various attaching means may be employed in this apparatus, the wing nuts 33 are preferred, inasmuch as they can readily be detached to enable the blades to be removed for cleaning or replacement purposes. The said agitator shaft 24 extends through the aperture in the hollow boss 34 of the upper support 35, the wall of the aperture serving as a bearing for the shaft. The lower terminal portion 36 of said shaft is rotatably supported by the bearing 37 contained on the base or lower support 38, the drawings showing the bearing consisting of a hollow boss 39 within which a single ball bearing 40 is positioned for rotatably supporting the said terminal 36.

The said upper support 35 contains four intersecting arms 41, 42, 43 and 44 the terminal portions of which contain therein holes 45, 46, 47 and 48 respectively; and the base support 38 also contains, in the preferred form thereof, four intersecting arms 49, 50, 51 and 52, these being connected by a peripheral portion 53. At diametrically opposite sections of said peripheral portion 53, and preferably in substantial alignment with the diametrically opposite arms 50 and 52, are two sets of upstanding pins 54 and 55, and 56 and 57 respectively. In substantial alignment with the other two diametrically opposed arms 49 and 51 are the slots or recesses 58 and 59 respectively,—the said pins and slots being positioned preferably at the corners of said peripheral portion 53. The underside of the base support 38 is provided with four legs 60, these not being shown in Figure 5 and only three thereof being shown in Figure 3,—said legs being preferably although not necessarily positioned at the corners of the said perpiheral portion 53. It will be noted that said legs 60 are of different lengths, dependent upon the shape of the floor 61 of the vat, the drawings showing the lateral sides of the floor elevated and the central portion depressed to permit a proper draining off of the fluid contained therein. The legs are also provided with caps 62 of rubber or other yieldable material, so as not to injure the glazed inner surface of the vat.

The said supports 35 and 38 are held in place within the vat and in fixed spaced disposition, by the oppositely disposed baffle members 63 and the two opositely disposed supporting members 64,—these being preferably glazed. The said baffle members 63 each consists of a plate 65 provided with a baffle element 66 substantially normal to the plane thereof and extending preferably along the medial longitudinal portion thereof, thereby forming a T section. In the form illustrated, the upper portion of the plate 65 is recessed to accommodate a brace 67 of inverted U-shaped construction, the outer wall 68 of which is provided with a screw 69 and handle 70, the shank of the screw being in threaded engagement with a suitable aperture in wall 68 to provide transverse adjustment of said screw 69 with respect thereto. The upper edge of the baffle 66 contains an expanded portion or boss 71 from which there extends the threaded stud 72. The supporting members 64 each contain a vertical plate portion 73 terminating at the upper portion in an inverted U-shaped brace 74 containing a downwardly extending wall 75 provided with a screw 76 and handle 77 similar in operation to the above-referred-to screw and handle 69 and 70 respectively. Attached to the inner face of the plate 73 is, in the form illustrated, an angle bar 73a, and a stud 72a extending upwardly therefrom. The bottom of the plate 73 contains a terminal portion 78 of reduced width adapted to be detachably inserted within either the recesses 58 or 59 to form the equivalent of a mortise and tenon joint.

This apparatus contains, as aforesaid, two oppositely disposed baffle members 63, and two other oppositely disposed supporting members 64, the braces 67 and 74 thereof, respectively, being positioned over the upper peripheral edges of the jacketed wall of the vat, the pads 79 of rubber or other compressible material being interposed between the braces and glazed surface of the vat for protective purposes. The baffle members 63 are each placed upon the base support 38 so that the bottom extremities of baffle 66 are positioned between the pins 54 and 55, and 56 and 57 respectively, thereby preventing a lateral movement of said baffle. The supporting members 64 are also positioned upon the lower support 38, the terminals 78 being received by the recesses 58 and 59 as aforesaid. The upper support 35 is held in position by the said members 63 and 64, two of the diametrically disposed arms, such as the arms 42 and 44, being supported by the upper edges by the baffle 66 and the other two arms by the angles 73a. The studs 72 and 72a extend through the said holes 45, 46, 47 and 48, and are operably engaged by the wing nuts 80 whereby the support 35 is detachably secured in place. The upper portions of the outer wall of the vat are provided with plates 81 which contain therein recesses 82 adapted to receive the terminal ends of the screws 69 and 76, to prevent relative movement of the braces 67 and 74 with respect to the vat. It will also be observed that the inner portion of the vat is provided with pads 83 positioned at each of the corners of the base support 38, for protective purposes.

When the wing nuts 80 and screws 69 are tightened, the entire inner structure is rigidly secured in place, the stresses created by the tightening of said elements producing a slight compression of the pads 79 and 83, to effect a yieldable support for the internal structure of the vat, thereby serving to absorb any vibration that may result from the rotation of shaft 24 and the mechanical forces produced by the agitation of the liquid. The upper and lower supports 35 and 38, respectively, are held, as aforesaid, in fixed relative position, such an arrangement obviously providing the shaft 24 with a fixed and firm support. No lateral movement of the baffles 66 is possible, due to the pins 54, 55, 56 and 57, and neither can there be a vertical displacement of the supports 35 and 38, due to their engagement with the members 63 and 64. It is also apparent that there can be no twisting or radial movements of either the members 63 and 64 or the supports 35 and 38, except the infinitesimal amount due to the yielding of the pads, which can only have a beneficial result on the operation and life of this device.

In the operation of this apparatus, the auxiliary cover 22 or the entire cover 15 may be removed, and the required amount of skim milk poured into the vat. For a predetermined period, generally five minutes, the liquid is permitted to be brought up to the required temperature, which for most practical purposes is assumed to be 60° F. It is, of course, understood that such heating is effectuated by the steam within jacket 11. During the time of initial heating, the propeller 24 is caused to rotate by suitable motor means connected by the coupling means 26, the speed of rotation being relatively slow to permit a rather gentle agitation. When the proper temperature is obtained, the speed is increased to a predetermined velocity and maintained there for a period of time, preferably fifteen minutes, whereafter the fluid is tapped off through the outlet 85. The buttermilk so withdrawn is immediately available for consumption.

It thus appears that the entire operation of heating and churning is effectuated in a single operation by the use of this apparatus, the invention being of such a nature as to permit an efficient agitation under the most sanitary conditions. In the process, after a given quantity of butter-fat is added, the rotation of the blades 31 and 32 will of necessity cause a swirling of the entire liquid mass within the vat, the liquid being thrown against the two oppositely disposed stationary baffles 66 to produce the required agitation. This operation is performed while heat is being supplied through the jacket 11, therefore enabling the entire operation to be performed at the most desirable temperature. Hence a product can be produced containing finely divided particles of butter-fat, which give both the necessary body and the characteristic buttermilk flavor that are frequently lacking in buttermilk prepared by chemical means or by means where the butter-fat is not as finely divided as could be effected with my invention.

It is also apparent that the structure above described is such as not only to prevent undue and disturbing vibration, but also to enable all the internal parts, such as the baffles, the shaft 24, the members 35, 38, 63 and 64, to be removed for cleaning and replacement purposes.

It is of course understood that other additional forms and modifications of the apparatus and adaptation of the method constituting this invention can be employed beyond and in addition to those hereinbefore described, all within the scope of the appended claims.

What I claim is:

1. In a buttermilk churn, a vat for containing a fluid, a fluid heating jacket surrounding the lateral wall of the vat, an agitator shaft extending into the vat and adapted for attachment to suitable exteriorly disposed motor means, agitator blades secured to the shaft for imparting a rotary movement to the fluid, an upper and a lower support each containing bearing means in operative engagement with said shaft, supporting means holding said supports in fixed spaced relation, and baffle means associated with certain of said supporting means for intercepting the rotating fluid to produce a mechanical agitation thereof, said baffle means including a vertical plate provided with a flat baffle element extending longitudinally of the plate and radially inwardly, said lower support containing a pair of spaced upstanding pins flanking said baffle element to prevent lateral movement thereof.

2. In a buttermilk churn, a vat for containing a fluid, a fluid heating jacket surrounding the lateral wall of the vat, an agitator shaft extending into the vat and adapted for attachment to suitable exteriorly disposed motor means, agitator blades secured to the shaft for imparting a rotary movement to the fluid, an upper and a lower support for said shaft each containing centrally disposed bearing means in operative engagement with the shaft, two diametrically opposite baffle members and two diametrically opposite supporting members, said members being detachably mounted upon said lower support and being in detachable engagement with the upper portion of the wall of the vat, the said upper support being detachably surmounted upon said baffle and said supporting members, said baffle members each including a vertical plate provided with a flat baffle element extending longitudinally of the plate and radially inwardly, and being adapted to intercept the rotating fluid to produce a mechanical agitation thereof.

3. A buttermilk churn according to the combination of claim 2, the upper support containing a plurality of intersecting radial arms in detachable engagement with said baffle and said supporting members, the said lower support comprising a plurality of intersecting radial arms connected by a peripheral portion upon which said baffle and said supporting members are detachably mounted.

4. In a buttermilk churn, a vat for containing a fluid, an agitator shaft extending into the vat and adapted for attachment to suitable exteriorly disposed motor means, agitator blades secured to the shaft for imparting a rotary movement to the fluid, an upper and a lower support each containing bearing means in operative engagement with said shaft, supporting means holding said supports in fixed spaced relation, and baffle means associated with certain of said supporting means for intercepting the rotating fluid to produce a mechanical agitation thereof, said baffle means including a vertical plate provided with a flat baffle element extending longitudinally of the plate and radially inwardly.

JULIUS COHEN.